US009698899B2

(12) United States Patent
Mukai et al.

(10) Patent No.: US 9,698,899 B2
(45) Date of Patent: Jul. 4, 2017

(54) SLAVE STATION APPARATUS, MASTER STATION APPARATUS, CONTROL DEVICE, COMMUNICATION SYSTEM, AND WAVELENGTH SWITCHING METHOD (71) Applicant: MITSUBISHI ELECTRIC CORPORATION, Chiyoda-ku (JP)

(72) Inventors: Hiroaki Mukai, Tokyo (JP); Takashi Nishitani, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/026,186

(22) PCT Filed: Nov. 1, 2013

(86) PCT No.: PCT/JP2013/079796
§ 371 (c)(1),
(2) Date: Mar. 30, 2016

(87) PCT Pub. No.: WO2015/063956
PCT Pub. Date: May 7, 2015

(65) Prior Publication Data
US 2016/0261337 A1 Sep. 8, 2016

(51) Int. Cl.
*H04B 10/03* (2013.01)
*H04B 10/079* (2013.01)
(Continued)

(52) U.S. Cl.
CPC ......... *H04B 10/03* (2013.01); *H04B 10/0791* (2013.01); *H04B 10/40* (2013.01);
(Continued)

(58) Field of Classification Search
None
See application file for complete search history.

(56) References Cited

U.S. PATENT DOCUMENTS

| 8,811,819 B2 | 8/2014 | Kazawa et al. |
| 2009/0272151 A1 | 11/2009 | Lacasse et al. |
| 2016/0248539 A1* | 8/2016 | Kaneko ............... H04J 14/0282 |

FOREIGN PATENT DOCUMENTS

| JP | 2010 34877 A | 2/2010 |
| JP | 2011 519337 A | 7/2011 |

(Continued)

OTHER PUBLICATIONS

"40-Gigabit-capable passive optical networks (NG-PON2): General requirements", International Telecommunication Union, 2013, 21 pages.
(Continued)

*Primary Examiner* — Darren E Wolf
(74) *Attorney, Agent, or Firm* — Oblon, McClelland, Maier & Neustadt, L.L.P.

(57) ABSTRACT

An ONU communicates with an OLT that can transmit optical signals having different wavelengths simultaneously and receive optical signals having different wavelengths simultaneously. The ONU includes: an optical transceiver that receives any one of the optical signals that the OLT can transmit and transmits any one of the optical signals that the OLT can receive; a communication failure detection unit that detects a communication failure between the OLT and the ONU; and a wavelength selection unit that, when the communication failure detection unit detects a communication failure, changes a setting of a downstream wavelength to be received by the optical transceiver and an upstream wavelength to be transmitted by the optical transceiver.

2 Claims, 6 Drawing Sheets

(51) Int. Cl.
*H04B 10/40* (2013.01)
*H04J 14/02* (2006.01)
*H04L 12/403* (2006.01)
*H04L 12/44* (2006.01)
*H04Q 11/00* (2006.01)

(52) U.S. Cl.
CPC ............ *H04J 14/02* (2013.01); *H04L 12/403* (2013.01); *H04L 12/44* (2013.01); *H04Q 11/0005* (2013.01); *H04Q 2011/0016* (2013.01); *H04Q 2011/0043* (2013.01)

(56) References Cited

FOREIGN PATENT DOCUMENTS

| | | |
|---|---|---|
| JP | 2012 66038 A | 4/2012 |
| JP | 2013 51656 A | 3/2013 |
| JP | 2011 234244 A | 11/2013 |
| WO | 2010 146658 A1 | 12/2010 |
| WO | 2013 157171 A1 | 10/2013 |

OTHER PUBLICATIONS

International Search Report Issued Dec. 10, 2013, in PCT/JP2013/079796 Filed Nov. 1, 2013.

* cited by examiner

|  | ACCOMMODATED ONU |
|---|---|
| PON TERMINATION UNIT $4_1$ | ONU#1,ONU#2,ONU#3,ONU#4,ONU#5,ONU#6,ONU#7,ONU#8 |
| PON TERMINATION UNIT $4_2$ | ONU#9,ONU#10,ONU#11,ONU#12,ONU#13,ONU#14,ONU#15, ONU#16 |
| PON TERMINATION UNIT $4_3$ | ONU#17,ONU#18,ONU#19,ONU#20,ONU#21,ONU#22,ONU#23, ONU#24 |
| PON TERMINATION UNIT $4_4$ | ONU#25,ONU#26,ONU#27,ONU#28,ONU#29,ONU#30,ONU#31, ONU#32 |

FIG.5

|  | ACCOMMODATED ONU |
|---|---|
| PON TERMINATION UNIT $4_1$ |  |
| PON TERMINATION UNIT $4_2$ | ONU#9,ONU#10,ONU#11,ONU#12,ONU#13,ONU#14,ONU#15, ONU#16,ONU#1,ONU#2,ONU#3,ONU#4,ONU#5,ONU#6,ONU#7, ONU#8 |
| PON TERMINATION UNIT $4_3$ | ONU#17,ONU#18,ONU#19,ONU#20,ONU#21,ONU#22,ONU#23, ONU#24 |
| PON TERMINATION UNIT $4_4$ | ONU#25,ONU#26,ONU#27,ONU#28,ONU#29,ONU#30,ONU#31, ONU#32 |

FIG.6

| | ACCOMMODATED ONU |
|---|---|
| PON TERMINATION UNIT $4_1$ | |
| PON TERMINATION UNIT $4_2$ | ONU#9,ONU#10,ONU#11,ONU#12,ONU#13,ONU#14,ONU#15, ONU#16,ONU#1,ONU#2,ONU#3, |
| PON TERMINATION UNIT $4_3$ | ONU#17,ONU#18,ONU#19,ONU#20,ONU#21,ONU#22,ONU#23, ONU#24,ONU#4,ONU#5,ONU#6 |
| PON TERMINATION UNIT $4_4$ | ONU#25,ONU#26,ONU#27,ONU#28,ONU#29,ONU#30,ONU#31, ONU#32,ONU#7,ONU#8 |

FIG.7

SLAVE STATION APPARATUS, MASTER STATION APPARATUS, CONTROL DEVICE, COMMUNICATION SYSTEM, AND WAVELENGTH SWITCHING METHOD

FIELD

The present invention relates to a slave station apparatus, a master station apparatus, a control device, a communication system, and a wavelength switching method that realize wavelength division multiplexing communication.

BACKGROUND

One example of an optical communication system is a passive optical network (PON) system. In order to increase the transmission capacity of the PON system, the signal transmission speeds have been increased. However, rather than on serial high-speed transmission, studies have been conducted on configurations in which the total amount of data to be transmitted through one optical fiber is increased by using different wavelength channels without increasing the speed of the signals, i.e., studies have been conducted on PON systems that use wavelength division multiplexing (WDM) (hereinafter, wavelength division multiplexing PON systems). In a wavelength division multiplexing PON system, a plurality of usable wavelengths are allocated to each of the communication (downstream communication) in the downstream direction, i.e., from the optical line terminal (OLT) toward the optical network units (ONUs), and the upstream communication, which is in the opposite direction. Each ONU communicates with the OLT by using one of the usable wavelengths (for example, see Patent Literature 1).

For example, when 32 ONUs (=32 users) are accommodated, in a PON system that does not perform wavelength division multiplexing, the transmission band for one wavelength is shared by 32 users. In contrast, in a wavelength division multiplexing PON system that is configured to use four waves for each of the upstream wavelength and the downstream wavelength, the number of users to be accommodated per wavelength can be reduced to eight (when the users are equally allocated to each wavelength). In other words, the band to be allocated to one user can be quadrupled.

CITATION LIST

Patent Literature

Patent Literature 1: WO2010/146658

SUMMARY

Technical Problem

However, with a wavelength division multiplexing PON system, there is a problem in that, when an optical transceiver in the OLT fails, it is impossible to keep providing a communication service to the users who are communicating via that optical transceiver. The OLT in the wavelength division multiplexing PON system includes a plurality of optical transceivers for transmitting a plurality of wavelengths to be used; therefore, a case is considered where, even when an optical transceiver used for transmission at a certain wavelength fails, other optical transceivers operate normally. In such a case, it is desirable that another wavelength is allocated to the users who cannot communicate because of a failure of an optical transceiver so that communication can be continued.

The present invention has been achieved in view of the above and it is an object of the present invention to provide a slave station apparatus, a master station apparatus, a control device, a communication system, and a wavelength switching method that realize highly reliable communication.

Solution to Problem

In order to solve the above problems and achieve the object, an aspect of the present invention is a slave station apparatus that communicates with a master station apparatus that is capable of transmitting a plurality of optical signals having different wavelengths simultaneously and is capable of receiving a plurality of optical signals having different wavelengths simultaneously. The slave station apparatus includes: an optical transceiver that receives any one of the optical signals that the master station apparatus is capable of transmitting and transmits any one of the optical signals that the master station apparatus is capable of receiving; a communication failure detection unit that detects a communication failure between the slave station apparatus and the master station apparatus; and a wavelength selection unit that, when the communication failure detection unit detects the communication failure, changes a setting of a downstream wavelength to be received by the optical transceiver and an upstream wavelength to be transmitted by the optical transceiver.

Advantageous Effects of Invention

The slave station apparatus according to the present invention has an effect that even when the slave station apparatus cannot communicate with the master station apparatus by using some of the optical signals that the master station apparatus can transmit and receive because of a failure in the master station apparatus, the slave station apparatus can still continue communication by switching the wavelength to be used.

DESCRIPTION OF EMBODIMENTS

Exemplary embodiments of a slave station apparatus, a master station apparatus, a communication system, and a wavelength switching method according to the present invention will be explained below in detail with reference to the drawings. This invention is not limited to the embodiments.

First Embodiment.

Figure 1:
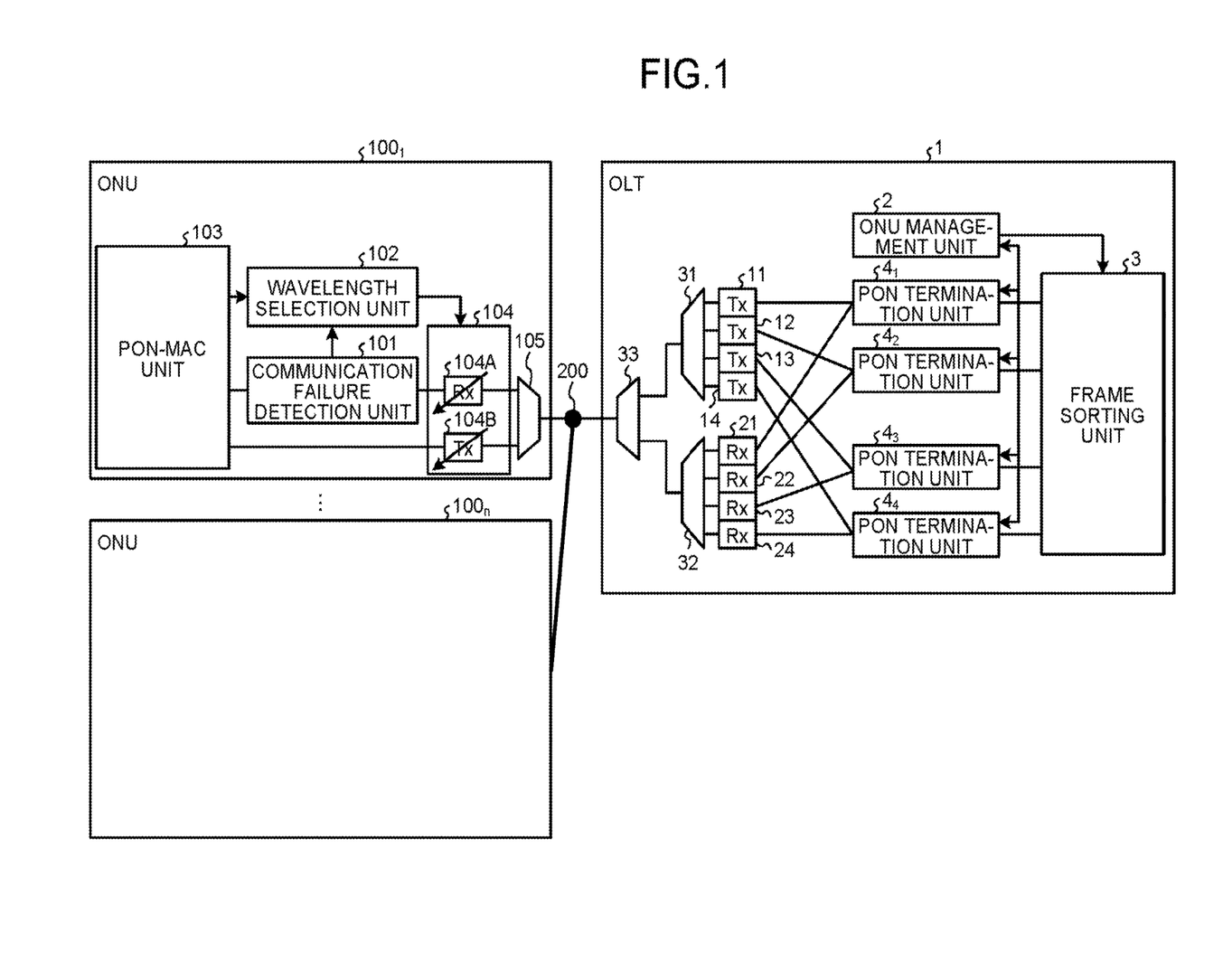
FIG. 1 is a diagram illustrating an example of the configuration of a communication system according to the present invention.

FIG. 1 is a diagram illustrating an example of the configuration of a communication system according to the present invention. In the present embodiment, an explanation will be given of a wavelength division multiplexing passive optical network (PON) system as an example of a communication system; however, the present invention is not limited to a PON system.

(Configuration of Communication System)

As illustrated in FIG. 1, the wavelength division multiplexing PON system includes an optical line terminal (OLT) 1, which operates as a master station apparatus, and n optical network units (ONUs) 100 (ONUs $100_1, \ldots, 100_n$), which are connected to the OLT 1 via optical fibers and a splitter 200 and which operate as slave station apparatuses. In the wavelength division multiplexing PON system in the present embodiment, four wavelengths are allocated to each of the upstream communication and the downstream communication and each ONU 100 communicates with the OLT 1 by using one specific wavelength of the four wavelengths. The configuration in which four wavelengths are usable wavelengths is one example and the number of wavelengths is any number that is greater than or equal to two. The ONUs 100 all have the same internal configuration. In FIG. 1, the internal configuration of only the ONU $100_1$ is illustrated and the illustration of the internal configuration of the ONU $100_n$ is omitted.

(Configuration of OLT)

As illustrated in FIG. 1, the OLT 1 includes an ONU management unit 2, a frame sorting unit 3, a plurality of PON termination, units 4 (PON termination units 41 to 44), optical transmitters (Tx) 11 to 14, optical receivers (Rx) 21 to 24, and multiplexers 31 and 33, and a demultiplexer 32. The number of the optical transmitters 11 to 14 and the number of the optical receivers 21 to 24 are equal to the number of the PON termination units 4.

The ONU management unit 2, which functions as an information management unit, manages individual information (such as a serial number and a MAC address) on each of the ONUs 100 accommodated by the OLT 1, the wavelengths used by the respective ONUs 100, and various pieces of information that are allocated to each of the ONUs 100 during the discovery process.

The frame sorting unit 3 transmits and receives frames to and from the upper-level network (not illustrated). When the frame sorting unit 3 receives a frame addressed to the OKU 100 from the upper-level network, the frame sorting unit 3 outputs the frame to the PON termination unit 4 that accommodates the destination ONU 100.

Each of the PON termination units 4, which function as optical termination units, is physically connected to any one of the optical transmitters 11 to 14 and any one of the optical receivers 21 to 24 and communicates with the ONUs 100 via the optical transmitter and the optical receiver to which it is connected. In other words, the PON termination units 4 transmit and receive frames for performing PON control to and from each of the ONUs 100. In the present embodiment, the optical transmitter 11 and the optical receiver 21 are connected to the PON termination unit $4_1$, the optical transmitter 12 and the optical receiver 22 are connected to the PON termination unit $4_2$, the optical transmitter 13 and the optical receiver 23 are connected to the PON termination unit $4_3$, and the optical transmitter 14 and the optical receiver 24 are connected to the PON termination unit $4_4$.

The optical transmitters 11 to 14 convert electrical signals output from the PON termination units 4 to which they are connected to optical signals and transmit the optical signals to the ONUs 100 via the multiplexer 31. The optical transmitters 11 to 14 transmit optical signals having wavelengths $\lambda_{11}$ and $\lambda_{14}$, respectively. $\lambda_{11}$ is a shorter wavelength.

The optical receivers 21 to 24 convert optical signals received from the ONUs 100 via the multiplexer 32 to electrical signals and output the electrical signals to the PON termination units 4 to which they are connected. The optical receivers 21 to 24 receive optical signals having wavelengths $\lambda_{21}$ and $\lambda_{24}$, respectively. $\lambda_{21}$ is a shorter wavelength.

The multiplexer 31 multiplexes optical signals output from the optical transmitters 11 to 14 and outputs the multiplexed optical signal to the multiplexer 33.

The demultiplexer 32 receives an optical signal in which a plurality of wavelengths are multiplexed from the multiplexer 33, demultiplexes the multiplexed wavelengths, and outputs them to the optical receivers 21 to 24.

The multiplexer 33 multiplexes the optical transmit signal received from the multiplexer 31 and the optical receive signal received from each of the ONUs 100.

(Configuration of ONU)

As illustrated in FIG. 1, the ONU 100 includes a communication failure detection unit 101, a wavelength selection unit 102, a PON-MAC unit 103, an optical transceiver 104, which includes an optical receiver 104A and an optical transmitter 104B, and a multiplexer 105.

The communication failure detection unit 101 detects a communication failure by monitoring frames transmitted from the OLT 1.

The wavelength selection unit 102 selects a wavelength to be used for communication with the OLT 1 and sets the optical transceiver 104 so that it can use the selected wavelength.

The PON-MAC unit (control device) 105 transmits and receives frames for PON control to and from the PON termination unit 4 of the OLT 1.

The optical transceiver 104 can adjust the wavelengths of optical signals to be transmitted and received and transmits and receives optical signals having wavelengths specified by the wavelength selection unit 102. When the wavelength selection unit 102 notifies the optical transceiver 104 of the wavelengths (upstream wavelength and downstream wavelength) selected by the wavelength selection unit 102, the optical transceiver 104 adjusts the wavelength received by the optical receiver 104A and the wavelength transmitted by the optical transmitter 104B in accordance with the content of the notification. The combination of the receive wavelength ($\lambda_{11}$ to $\lambda_{14}$) and the transmit wavelength ($\lambda_{21}$ to $\lambda_{24}$) is fixed. In other words, when the optical transceiver 104 sets the wavelength to be received by the optical receiver 104A to $\lambda_{1x}$, the optical transceiver 104 sets the wavelength to be transmitted by the optical transmitter 104B to $\lambda_{2x}$ (x=1, 2, 3, 4). For convenience sake, an explanation will be given of an integrated optical transceiver 104, which includes the optical receiver 104A and the optical transmitter 104B; however, the optical receiver 104A and the optical transmitter 104B may be separated from each other.

The multiplexer 105 multiplexes the optical transmit signal received from the optical transmitter 104B and the optical receive signal received front the OLT 1.

Next, a characteristic operation of the present embodiment will be described. Specifically, an explanation will be given of a recovery operation in a case when a communication failure occurs. The operation that will be described as an example is of a case when, among the optical transmitters 11 to 14 included in the OLT 1, the optical transmitter 11, which rises the transmit wavelength $\lambda_{11}$, has failed. It is assumed that the ONU 100$_1$ receives an optical signal having the wavelength $\lambda_{11}$. Operations of a case when the optical transmitters 12 to 14 have failed are similar.

Figure 2:
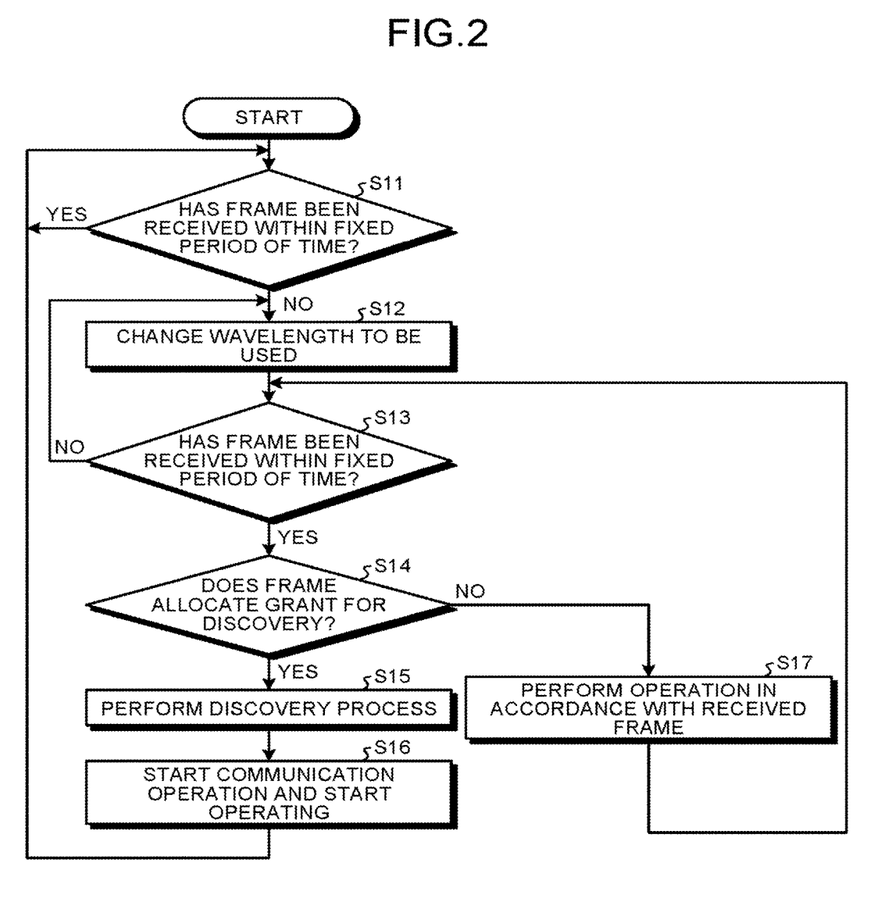
FIG. 2 is a flowchart illustrating an example of the operation performed by an ONU.

First, an explanation will be given, with reference to FIG. 1 and FIG. 2, of an operation when the ONU 100$_1$ detects a failure of the optical transmitter 11 in the OLT 1 and switches the wavelength. FIG. 2 is a flowchart illustrating an example of the operation performed by the ONU 100.

In the ONU 100$_1$, the communication failure detection unit 101 monitors whether a frame has been received within a fixed period of time (Step S11). The communication failure detection unit 101 continues the monitoring operation, for example, when a control frame is received within a period T1 (Yes at Step S11). The communication failure detection unit 101 outputs the received frame to the PON-MAC unit 103. In contrast, when a control frame has not been received for the period T1, the communication failure detection unit 101 determines that the optical transmitter (the optical transmitter 11) that transmits an optical signal having the selected wavelength $\lambda_{11}$ has failed, notifies the wavelength selection unit 102 to that effect, and starts the operation of changing the wavelength to be used (No at Step S11).

In the case of an EPON according to the IEEE standard, the control frame, for example, means a control frame that the ONU needs to receive at least every 50 ms, such as a GATE message. In the case of a G-PON according to the ITU-T standard, the control frame is a frame header received every 125 μs. The value of T1 described above is determined in accordance with the standard to be applied. Specifically, in the case of an EPON, T1 is set to a value larger than 50 ms, and, in the case of a G-PON, T1 is set to a value larger than 125 μs.

The communication failure detection unit 101, for example, includes a counter that counts T1. When a control frame is received from the OLT 1, the communication failure detection unit 101 resets the counter. When the optical transmitter 11 in the OLT 1 fails and thus a control frame cannot be received (the optical transmitter 11 cannot transmit a control frame), the counter expires and the communication failure detection unit 101 notifies the wavelength selection unit 102 of the detection of the failure of the optical transmitter in the OLT 1.

When the wavelength selection unit 102 receives the notification of the detection of the failure from the communication failure detection unit 101, the wavelength selection unit 102 adjusts the optical transceiver 104 so that it is set such that it transmits and receives wavelengths that are different from the wavelengths that have been transmitted and received. In other words, the wavelength selection unit 102 adjusts the optical receiver 104A so as to tune the receive optical wavelength such that the optical receiver 104A receives optical signals having a wavelength different from the wavelength $\lambda_{11}$ that has been received. Moreover, the wavelength selection unit 102 adjusts the optical transmitter 104B so as to tune the transmit optical wavelength such that the optical transmitter 104B transmits optical signals having a wavelength different from the wavelength $\lambda_{21}$ that has been transmitted. For example, the wavelength selection unit 102 tunes the receive optical wavelength and the transmit optical wavelength such that the wavelength $\lambda_{12}$ is received and the wavelength $\lambda_{22}$ is transmitted (Step S12).

Moreover, at this point, as a result of the communication failure detection unit 101 detecting the failure of the optical transmitter (the optical transmitter 11) in the OLT 1, the PON-MAC unit 103 returns to the initial state from the operating state and transitions to the downstream-frame reception stand-by state. Thereafter, the PON-MAC unit 103 waits for the reception of a frame that allocates a grant for the discovery from the OLT 1. When the PON-MAC unit 103 receives the frame, the PON-MAC unit 103 responds to the frame and transitions to the operating state via the discovery process (Steps S13, S14, S15, and S16).

In other words, the communication failure detection unit 101 monitors whether a frame has been received within a fixed period of time (period T1) (Step S13). When a frame cannot be received (No at Step S13), the communication failure detection unit 101 determines that the optical transmitter in the OLT 1 (the optical transmitter 12), which transmits optical signals having the wavelength $\lambda_{12}$ changed at Step S12 described above, has failed and changes, for a second time, the wavelength to be transmitted and received (Step S12). For example, the receive wavelength is changed to $\lambda_{13}$ and the transmit wavelength is changed to $\lambda_{23}$. When the communication failure detection unit 101 has received a frame (Yes at Step S13), the frame is passed to the PON-MAC unit 103 and the PON-MAC unit 103 checks whether the received frame is a frame that allocates a grant for the discovery (Step S14). When the received frame is a frame that allocates a grant for the discovery (Yes at Step S14), the PON-MAC unit 103 performs the discovery process (Step S15). After the discovery process is completed, the ONU 100$_1$ starts operating (Step S16). When the received frame is not a frame that allocates a grant for the discovery (No at Step S14), the PON-MAC unit 103 performs the process in accordance with the received frame (Step S17), returns to Step S13, and waits for the reception of the next frame. Steps S12 and S13 described above are repeated until the ONU 100$_1$ enters the operating state.

In the above explanation, the communication failure detection unit 101 detects a failure by checking whether a control frame has been received within the period T1 (whether the elapsed time from when a control frame was last received has reached T1); however, it is also possible to detect a failure by checking whether any of a control frame and a data frame has been received within the period T1. In other words, when the communication failure detection unit 101 includes a counter that counts T1, the counter may be reset when any of a control frame and a data frame is received.

Moreover, the communication failure detection unit 101 and the wavelength selection unit 102 are separated from each other; however, they may be integrated. Furthermore, one or both of the functions that realize the communication failure detection unit 101 and the wavelength selection unit 102 may be included in the PON-MAC unit 103.

Figure 3:
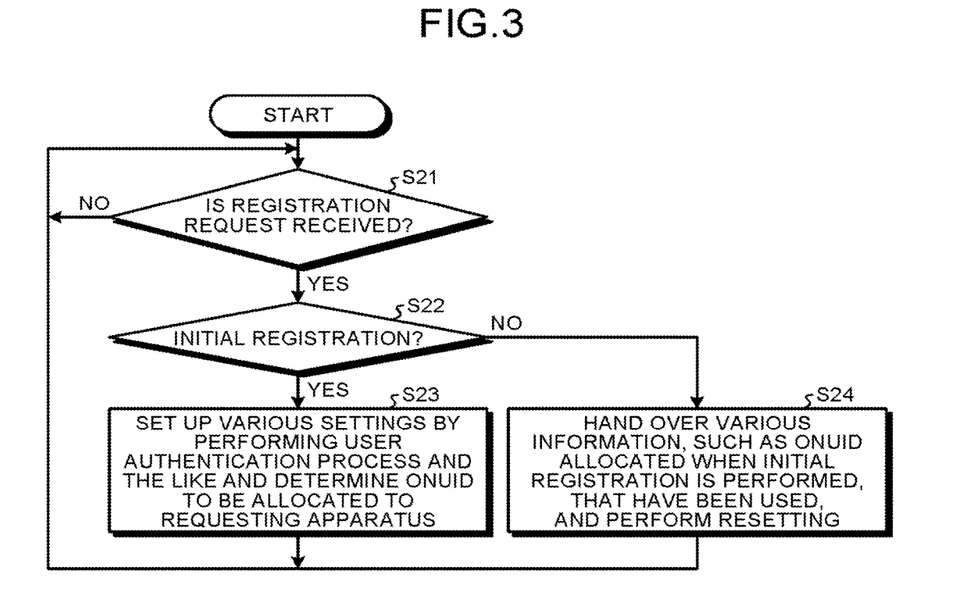
FIG. 3 is a flowchart illustrating an example of the operation performed by an OLT.

Next, a characteristic operation of the OLT 1 will be described with reference to FIG. 1 and FIG. 3. FIG. 3 is a flowchart illustrating an example of the operation performed by the OLT 1. Specifically, FIG. 3 illustrates the operation of a case when the ONU 100 that desires to start operating requests the OLT 1 to start the discovery process.

In the OLT 1, when each of the PON termination units 4 receives a frame from the ONU 100, the PON termination unit 4 determines whether the received frame is a frame (registration request frame) requesting that the discovery process be started (Step S21). When the received frame is a registration request frame (Yes at Step S21), the PON termination unit 4 outputs the received frame to the ONU management unit 2, and then the ONU management unit 2 determines whether registration is the initial registration (Step S22). When the transmission source of the registration request frame received from the PON termination unit 4 is the ONU 100 that is connected to the master station apparatus (the OLT 1) for the first time, the ONU management unit 2 determines that registration is the initial registration. When the transmission source of the registration request frame is the ONU 100 for which the initial registration has been completed and which is in the operating state, the ONU management unit 2 determines that registration is other than the initial registration (hereinafter, referred to as re-registration). As has already been described above, the ONU management unit 2 manages the individual number (identification information) of the ONUs 100 accommodated by the OLT 1 and the like; therefore, the ONU management unit 2 can determine whether registration is the initial registration.

In the case of the initial registration (Yes at Step S22), the ONU management unit 2 performs a normal registration operation. For example, the ONU management unit 2 notifies an authentication server (not illustrated) or the like of the information on the ONU 100 that is a registration request source and inquires whether the ONU 100 is an authorized user (whether the ONU 100 is a user who can receive a communication service) (user authentication process). When the ONU 100 is an authorized user, the ONU management unit 2 determines, for example, the ONUID (or LLID (Logical Link ID)) to be allocated to the ONU 100 (Step S23). In the user authentication process, the ONU management unit 2, for example, obtains information on the contracted services (for example, information on the set band, such as the maximum band and the minimum guaranteed band). The ONU management unit 2 notifies the PON termination unit 4 that accommodates the ONU 100 that is a registration request source of the information, such as information (authentication information, information on the set band, and the like) obtained by performing the user authentication process and the determined ONUID (or LLID) (hereinafter, these pieces of information are collectively referred to as ONU management information). Moreover, the ONU management unit 2 performs a process of setting, in the frame sorting unit 3, the output destination (i.e., setting which one of the PON termination units 4 a frame is to be output to) when a frame addressed to the ONU 100 is received. Once the ONU management unit 2 obtains the ONU management information, the ONU management unit 2 continues storing the ONU management information even after the ONU management unit 2 notifies the PON termination unit 4 of the ONU management information. It is assumed that the ONU management unit 2 recognizes the ONUs 100 accommodated by each of the PON termination units 4.

The PON termination unit 4 that is notified of the ONU management information changes the internal setting in accordance with the indicated ONU management information and starts to provide a communication service to the ONU 100 that is a registration request source. As a result, the ONU 100 that is a registration request source enters the operating state.

In contrast, when it is determined at Step S22 described above that registration is not the initial registration (No at Step S22), the ONU management unit 2 notifies the PON termination unit 4 that accommodates the ONU 100 that is a re-registration request source of the ONU management information obtained when the ONU 100 that requests re-registration performs the initial registration. In other words, when the ONU 100 that was in the operating state has detected a communication failure and changed the wavelength, the ONU management information that was used by the PON termination unit 4 that had accommodated the ONU 100 before the wavelength was changed is handed over to the PON termination unit 4 that transmits and receives the changed wavelength (Step S24). Moreover, the ONU management unit 2 sets, in the frame sorting unit 3, the output destination (i.e., setting which one of the PON termination units 4 a frame is to be output to) when a frame addressed to the ONU 100 is received.

The PON termination unit 4 that is notified of the ONU management information changes the internal setting in accordance with the indicated ONU management information and starts to provide a communication service to the ONU 100 that is a registration request source.

In a normal PON system, after the OLT detects a connection with the ONU in the discovery process, authentication is performed, and then band setting, connection setting, and the like are performed. Therefore, it takes time before the service to the user is started. In the OLT 1 in the present embodiment, once the ONU is connected, the information on the ONU (ONU management information including authentication information, information on the settling band, LLID, and the like) is consolidated in the ONU management unit 2; therefore, for example, when the ONU that was operating by using the wavelength $\lambda_{11}$ is registered as using a different wavelength, one ONU management information that is used when the ONU was operating by using the wavelength $\lambda_{11}$ is handed over. Therefore, it is possible to reduce the time before the service is resumed.

In the above explanation, for ease of description, an explanation has been given of an operation when one ONU 100 detects a failure of an optical transmitter in the OLT 1; however, when an optical transmitter in the OLT 1 fails, a plurality of ONUs 100 that are set such that they receive the wavelength transmitted by the failed optical transmitter detect the failure substantially at the same time. As a result, the ONUs 100 that have detected the failure may transmit registration request frames substantially at the same time and thus frames may collide with each other on the wavelength channel. Thus, the ONU 100 transmits the registration request frame, for example, at a timing to which a random delay is applied so as to reduce the possibility that the registration request frame collides with a registration request frame transmitted from another ONU 100.

In such a manner, in the communication system of the present embodiment, the ONU 100 monitors the interval at which a frame is received from the OLT 1, and when a frame cannot be received for a fixed period of time, the ONU 100 switches the transmit wavelength of optical signals and also switches the receive wavelength of optical signals and performs re-registration such that it uses the switched wavelengths. Accordingly, even when some of the optical transmitters included in the OLT 1 have failed, the ONUs 100 that are affected by the failure can automatically reestablish a link on another usable wavelength channel and thus can continue communication. Moreover, in the OLT 1, the ONU management unit 2 consolidates the ONU management information on the ONUs 100 that have completed the initial registration. When the registration request received from the ONU 100 corresponds to re-registration, the OLT 1 performs the re-registration process by using the consolidated ONU management information. Therefore, the time required for the re-registration process can be minimized and thus the communication interruption time when a communication failure occurs can be shortened.

The following examples of the above-described processes and control methods performed by each component of the OLT 1 and the ONU 100 may be realized by a digital signal processing circuit or by a software process executed by a microcomputer or the like: information management of each of the ONUs 100 performed by the ONU management unit 2, the process of transmitting and receiving frames performed by the frame sorting unit 3, the process of detecting a failure of an optical transmitter in the OLT 1 performed by the communication failure detection unit 101, the process of adjusting the wavelengths to be used for transmission and reception performed by the wavelength selection unit 102, and the frame reception process performed by the PON-MAC unit 103.

Second Embodiment.

A second embodiment will be described below. The system configuration and the configurations of the OLT and the ONUs are similar to those in the first embodiment (see FIG. 1).

Figure 4:
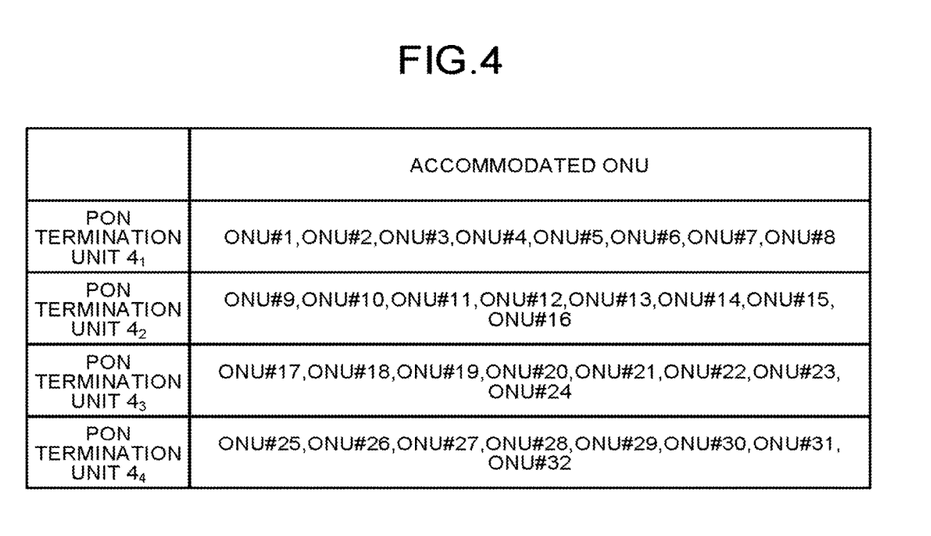
FIG. 4 is a diagram illustrating an example of the accommodation state of ONUs accommodated by PON termination units.
Figure 5:
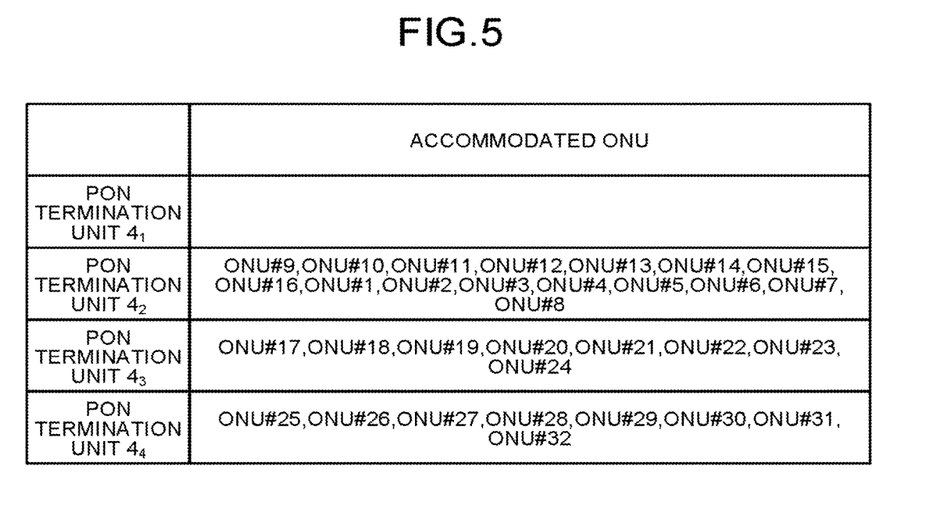
FIG. 5 is a diagram illustrating an example of the accommodation state of the ONUs accommodated by the PON termination units.

In the first embodiment, an example is illustrated in which the ONU 100 that has detected a failure of an optical transmitter in the OLT 1 shifts the receive wavelength and the transmit wavelength from $\lambda_{11}$ and $\lambda_{12}$ to the longer wavelength side in stages. However, when there are a plurality of ONUs 100 that have detected a failure and they shift the wavelengths in the same manner, the new destinations that accommodate the ONUs 100 that have detected the failure are concentrated in a specific one of the PON termination units 4. The example considered here is a case where 32 ONUs 100 are accommodated by the OLT 1 and the accommodation state of the ONUs 100 in a normal state before the detection of a failure is as illustrated in FIG. 4. In FIG. 4, 32 ONUs 100 are represented by ONUs #1 to #32; the ONUs #1 to #8 are accommodated by the PON termination unit $4_1$; the ONUs #9 to #16 are accommodated by the PON termination unit the ONUs #17 to #24 are accommodated by the PON termination unit $4_3$; and the ONUs #25 to #32 are accommodated by the PON termination unit $4_4$. In such a state, for example, when the optical transmitter 11 connected to the PON termination unit $4_1$ fails and the ONUs #1 to #8 select a new wavelength by using the same method, as, for example, illustrated in FIG. 5, the accommodation state becomes such that the accommodation destinations are biased to the PON termination unit $4_2$ and thus the band is allocated unequally.

In order to solve the above problem, in the communication system in the present embodiment, the wavelength selection unit 102 of each of the ONUs 100 individually stores information on the methods of reselecting a wavelength when a failure is detected, such as selecting a longer wavelength in stages, selecting a shorter wavelength in stages, randomly selecting a wavelength, and selecting a specific wavelength (a wavelength to foe reselected when a failure is detected is predetermined). "Selecting a longer wavelength in stages" indicates selecting a wavelength adjacent, on the longer wavelength side, to the wavelength that is being used when a failure is detected (shifting the used wavelength to the longer wavelength side as described in the first embodiment). "Selecting a shorter wavelength in stages" indicates selecting a wavelength adjacent, on the shorter wavelength side, to the wavelength that is being used when a failure is detected. Thus, it is possible to avoid having all the ONUs 100 that have detected a failure reselect a wavelength by using the same method and thus new accommodation destinations are not concentrated. For example, the wavelength reselection methods are stored in a ROM or the like of the ONUs 100 when they are shipped or the wavelength reselection method is designated as configuration information by the OLT 1 when each of the ONUs 100 is initially connected to the OLT 1 (when the discovery process is performed) and the PON-MAC unit 103 of the ONU 100 sets if in the wavelength selection unit 102.

Figure 6:
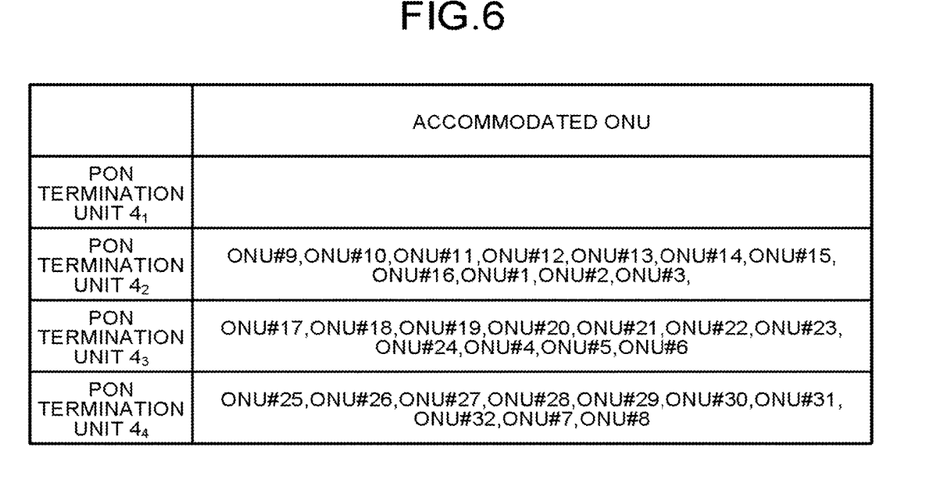
FIG. 6 is a diagram illustrating an example of the accommodation state of the ONUs accommodated by the PON termination units.

In such a manner, when the ONU 100 in the present embodiment reselects a wavelength as a result of the detection of a failure, the ONU 100 uses one of a plurality of wavelength reselection methods. Accordingly, it is possible to avoid having reconnected ONUs be concentrated on another specific wavelength channel after one optical transmitter fails. Therefore, as illustrated in FIG. 6, the accommodation state of the ONUs 100 in the PON termination units 4 can be made uniform and thus the load can be distributed.

Third Embodiment.

Next, a third embodiment will be described. The system configuration and the configurations of the OLT and the ONUs are similar to those in the first and second embodiments (see FIG. 1).

In the first embodiment, an explanation has been given of a recovery operation when a communication failure occurs because of a failure of an optical transmitter included in the OLT 1. In the present embodiment, an explanation will be given of a recovery operation when an optical receiver included in the OLT 1 fails and then a communication failure occurs.

In the OLT 1, when each of the PON termination units 4 has not received an upstream frame from the ONUs 100 accommodated by the PON termination unit 4 for a fixed period of time, the PON termination unit 4 transmits a frame that instructs the ONUs 100 that have not transmitted an upstream frame to return to their initial states.

Figure 7:
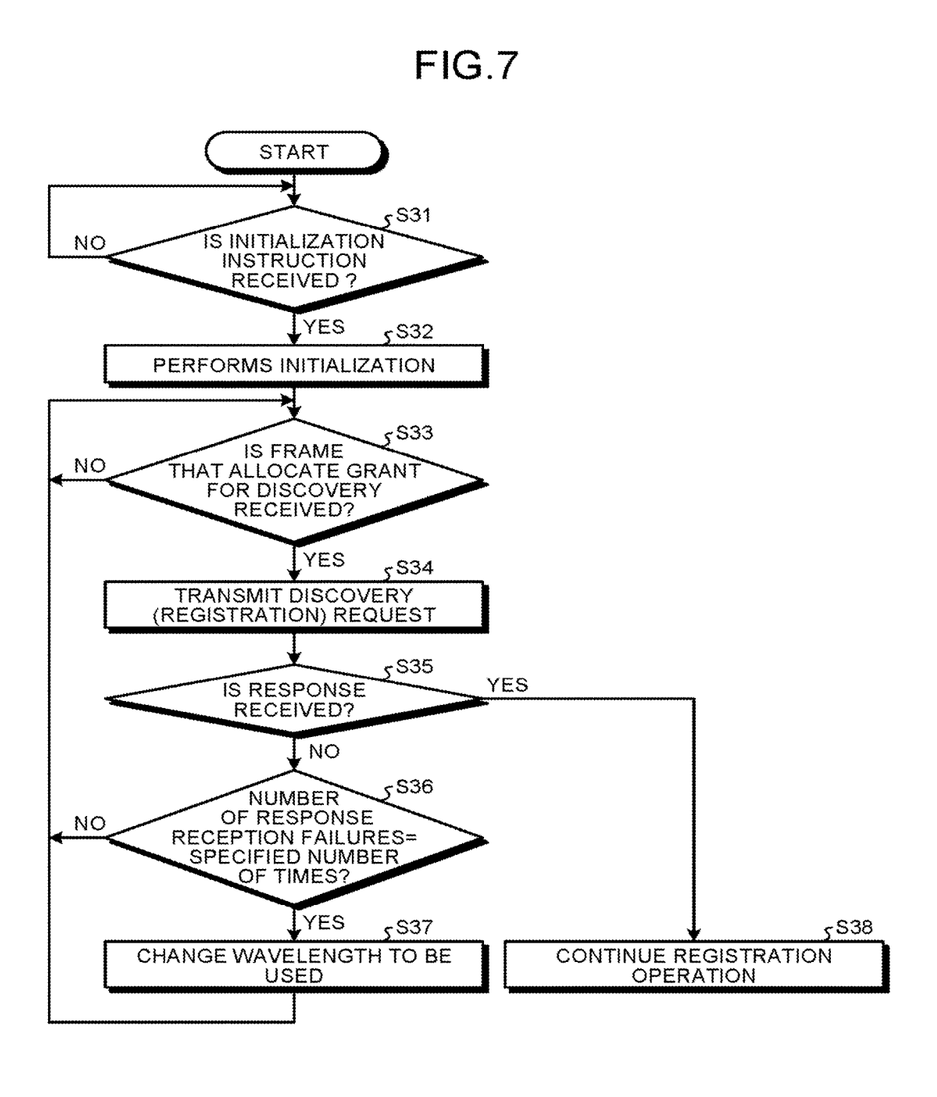
FIG. 7 is a flowchart illustrating an example of the operation performed by the ONU in a third embodiment.

When the optical receivers 21 to 24 included in the OLT 1 fail, even though the ONUs 100 are operating normally, the PON termination units 4 of the OLT 1 cannot receive an upstream frame. Thus, the PON termination units 4 instruct the ONUs 100 to return to their initial states. With the configuration illustrated in FIG. 1, for example, when the optical receiver 21 fails, the PON termination unit $4_1$ cannot receive an upstream frame at all. As a result, the PON termination unit $4_1$ instructs each of the ONUs 100 being controlled to return to their initial states by transmitting a control frame to each of the ONUs 100. Each of the ONUs 100 that have received the instruction (initialization instruction) performs an operation in accordance with the flowchart illustrated in FIG. 7 and switches the wavelength to be used for communication with the OLT 1. FIG. 7 is a flowchart illustrating an example of the operation performed by the ONU 100 in the third embodiment.

The operation of the ONU 100 in the present embodiment will be explained with reference to FIG. 1 and FIG. 7.

In the ONU 100, when the PON-MAC unit 103 receives an initialization instruction from the OLT 1 (Yes at Step S31), the PON-MAC unit 103 performs initialization (Step S32). Specifically, the PON-MAC unit 103 changes the internal setting so that the state is returned to the state before the discovery process is performed the ONU 100 and the OLT 1 (the state where registration with the OLT 1 has not been completed).

In order to perform registration with the OLT 1, the PON-MAC unit 103 that has performed initialization waits for the frame that allocates a grant for the discovery to be transmitted (Step S33). When the frame is received (Yes at Step S33), the PON-MAC unit 103 transmits a frame that requests the discovery (registration) (Step S34) and waits for a response to the frame to be transmitted (Yes at Step S35).

When a response is received (Yes at Step S35), the PON-MAO unit 103 continues its operation and performs the discovery process (Step S38). When the discovery process is completed, the ONU 100 enters the operating state. The discovery process is similar to that in the first embodiment, i.e., the discovery process that is performed after the communication failure detection unit 101 determines that an optical transmitter in the OLT 1 has failed, the wavelength selection unit 102 changes the settings of the optical transceiver 104, and then the wavelength used for communication with the OLT 1 is changed.

In contrast, when a response to the frame that requests the discovery cannot be received within a specified period of time (No at Step S35), the PON-MAC unit 103 checks whether the cumulative number of times the PON-MAC unit 103 has failed to receive a response to the frame that requests the discovery has reached a specified number of times (Step S36). When the cumulative number of times has not reached the specified number of times (No at Step S36), the process returns to Step S33 and the PON-MAC unit 103 waits for the frame that allocates a grant for the discovery to be transmitted. When the process is returned to Step S33, the cumulative number of times the PON-MAC unit 103 has failed to receive a response to the frame that requests the discovery is incremented by one. The cumulative number of times may be incremented by one before performing the checking (comparison between the cumulative number of times and the specified number of times) at Step S36.

In contrast, when the cumulative number of times has reached the specified number of times (Yes at Step S36), the PON-MAC unit 103 determines that an optical receiver in the OLT 1 has failed and notifies the wavelength selection unit 102 to that effect. The wavelength selection unit 102 that has received the notification adjusts the optical transceiver 104 so that it is set such that it transmits and receives wavelengths that are different from the wavelengths that have been transmitted and received (Step S37). When the PON-MAC unit 103 determines that an optical receiver in the OLT 1 has failed, the PON-MAC unit 103 initializes the cumulative number of times (the cumulative number of times the PON-MAC unit 103 has failed to receive a response to the frame that requests the discovery). Thereafter, the PON-MAC unit 103 performs processes at Steps S33 to S38 described above with respect to the wavelengths that are transmitted and received by the optical transceiver 104 whose settings have been changed. The processes at Steps S33 to S37 are continued until the registration with the OLT 1 is completed and the ONU 100 enters the operating state.

It is possible for the communication failure detection unit 101 to perform the processes at Steps S35 and S36 described above, i.e., the process of monitoring whether a response to the discovery request frame transmitted by the PON-MAC unit 103 has been received, counting the number of times the PON-MAC unit 103 has failed to receive a response, and detecting a failure of an optical receiver in the OLT 1.

In the communication system in the present embodiment, as described in the second embodiment, when the wavelength is changed at Step S37 described above, each of the ONUs 100 that have received an instruction from the OLT 1 to return to its initial state may use a predetermined one of the wavelength reselection methods so that the load is distributed.

The load can be distributed by the OLT 1 operating as follows. That is, because the ONU management unit 2 of the OLT 1 recognizes the number of ONUs 100 accommodated by each of the PON termination units 4, when the ONU management unit 2 receives, from the PON termination unit 4, a registration request frame that requests the starting of the discovery process, the ONU management unit 2 compares the number of ONUs accommodated by the PON termination unit 4 (hereinafter, a first PON termination unit) with the number of ONUs accommodated by another PON termination unit 4 (hereinafter, a second PON termination unit). When the number of ONUs accommodated by the first PON termination unit is larger than the number of ONUs accommodated by the second PON termination unit (when there is a second PON termination unit that accommodates a smaller number of ONUs), the ONU management unit 2 performs a control such that a response to the registration request frame is not returned. As a result, the ONU 100 reselects another wavelength. Thus, the registration request frame is sent by using the reselected wavelength. Finally, the ONU 100 is accommodated by the PON termination unit 4 that accommodates the smallest number of ONUs. With this method, although the time required for the entire process of changing the wavelength increases, the number of ONUs accommodated by each of the PON termination units 4 can be made equal.

In such a manner, in the communication system of the present embodiment, when the PON termination unit 4 of the OLT 1 has not received an upstream frame from the ONUs 100 accommodated by the PON termination unit 4 for a fixed period of time, the PON termination unit 4 instructs the ONUs 100 to return to their initial states. When the PON-MAC unit 103 of the ONU 100 is instructed to return to its initial state, the PON-MAC unit 103 performs the discovery process. When the number of consecutive times the PON-MAC unit 103 has failed to perform the discovery has reached the specified number of times, the PON-MAC unit 103 determines that the optical receiver in the OLT 1 has failed and determines that it is necessary to change the wavelength to be used for communication with the OLT 1. Accordingly, even when some of the optical receivers included in the OLT 1 have failed, the ONUs 100 that are affected by the failure can automatically reestablish a link on another usable wavelength channel and thus can continue communication. Moreover, as described in the first embodiment, in the OLT 1, the ONU management unit 2 consolidates the ONU management information on the ONUs 100 that have completed the initial registration. When the registration request received from the ONU 100 corresponds to re-registration, the OLT 1 performs the re-registration process by using the consolidated ONU management. information. Therefore, the time required for the re-registration process can be minimized and thus the communication interruption time when a communication failure occurs can be shortened.

In the present embodiment, it is determined that a communication failure occurs when the number of consecutive times the PON-MAC unit 103 has failed to receive a response to the request (registration request frame) for the start of the discovery process after receiving the initialization instruction from the OLT 1 has reached the specified number of times. However, it is also possible to determine whether a communication failure has occurred by using a different method. For example, when the number of consecutive times the PON-MAC unit 103 has failed to receive a response to the request for the allocation of an upstream band has reached a specified number of times, it is determined that a communication failure has occurred.

Fault tolerance can be improved by applying at least one of the first to third embodiments described above and thus a highly reliable communication can be realized.

INDUSTRIAL APPLICABILITY

As described above, a slave station apparatus, a master station apparatus, a communication system, and a wavelength switching method according to the present invention are useful for a communication system that performs communication by using a wavelength channel selected by the slave station apparatus and the master station apparatus from among a plurality of wavelengths.

REFERENCE SIGNS LIST

1 OLT, 2 ONU management unit, 3 frame sorting unit, 4$_1$, 4$_2$, 4$_3$, 4$_4$ PON termination unit, 11 to 14, 104B optical transmitter, 21 to 24, 104A optical receiver, 31, 33, 105 multiplexer, 32 demultiplexer, 100$_1$, 100$_n$ ONU, 102 wavelength selection unit, 103 PON-MAC unit, 104 optical transceiver, 200 splitter.

The invention claimed is:

1. A master station apparatus that accommodates at least one slave station apparatus and communicates with the slave station apparatus by allocating one of a plurality of optical signals having different wavelengths to each slave station apparatus, the master station apparatus comprising:
   a plurality of optical termination units that communicate with the slave station apparatus by using the optical signals having different wavelengths; and
   an information management unit that manages identification information on a slave station apparatus accommodated by each of the optical termination units and setting information that is information indicating content that is set by each of the optical termination units during a process for initial connection with each slave station apparatus, the identification information and the setting information being associated with each other, wherein
   when the information management unit receives an initial connection request from a slave station apparatus via an optical termination unit, the information management unit checks whether the process for initial connection with the slave station apparatus has been performed, and, when the process for initial connection with the slave station apparatus has been performed, the information management unit outputs setting information associated with identification information on the slave station apparatus to an optical termination unit that has relayed the initial connection request.

2. A communication system that includes a master station apparatus that is capable of transmitting a plurality of optical signals having different wavelengths simultaneously and is capable of receiving a plurality of optical signals having different wavelengths simultaneously and a slave station apparatus that communicates with the master station apparatus, wherein
   the slave station apparatus includes
      an optical transceiver that receives any one of the optical signals that the master station apparatus is capable of transmitting and transmits any one of the optical signals that the master station apparatus is capable of receiving,
      a communication failure detection unit that detects a communication failure between the slave station apparatus and the master station apparatus, and
      a wavelength selection unit that, when the communication failure detection unit detects the communication failure, changes a setting of a downstream wavelength to be received by the optical transceiver and an upstream wavelength to be transmitted by the optical transceiver,
   the master station apparatus includes
      a plurality of optical termination units that communicate with the slave station apparatus by using the optical signals having different wavelengths, and
      an information management unit that manages identification information on a slave station apparatus accommodated by each of the optical termination units and setting information that is information indicating content that is set by each of the optical termination units during a process for initial connection with each slave station apparatus, the identification information and the setting information being associated with each other, and
   when the information management unit receives an initial connection request from a slave station apparatus via an optical termination unit, the information management unit checks whether the process for initial connection with the slave station apparatus has been performed, and, when the process for initial connection with the slave station apparatus has been performed, the information management unit outputs setting information associated with identification information on the slave station apparatus to an optical termination unit that has relayed the initial connection request.

* * * * *